United States Patent [19]

Chen

[11] Patent Number: 4,986,169
[45] Date of Patent: Jan. 22, 1991

[54] VEHICULAR INTERNAL FAN VENTILATOR

[76] Inventor: Ming-Hsiung Chen, 7F, 16, Alley 3, Lane 227 Nung-An Street, Taipei, Taiwan

[21] Appl. No.: 410,757

[22] Filed: Sep. 22, 1989

[51] Int. Cl.$^5$ .............................................. B60H 1/24
[52] U.S. Cl. ................................ 98/2.02; 98/2.13; 98/900
[58] Field of Search .............. 98/2.02, 2.12, 2.13, 98/2.18, 900

[56] References Cited

U.S. PATENT DOCUMENTS

| 4,741,256 | 5/1988 | Huang | 98/2.18 X |
| 4,756,242 | 7/1988 | Keith | 98/2.13 |
| 4,899,645 | 2/1990 | Wolfe et al. | 98/2.02 |

FOREIGN PATENT DOCUMENTS

| 3624291 | 1/1988 | Fed. Rep. of Germany | 98/2.13 |
| 53423 | 3/1985 | Japan | 98/2.18 |
| 31835 | 2/1986 | Japan | 98/900 |
| 280338 | 12/1986 | Japan | 98/42.11 |
| 2197944 | 6/1988 | United Kingdom | 98/2.02 |

Primary Examiner—Harold Joyce
Attorney, Agent, or Firm—Ladas & Parry

[57] ABSTRACT

A vehicular internal fan ventilator, which includes a housing having set therein an internal ventilating chamber with a cross-flow air fan, a motor, a storage batteries and selector and a switch and a linkage to an oblique, external portion of housing which is fixedly mounted a solar cell board to collect solar energy for the motor and/or to charge the storage batteries. The housing comprises a top retainer rib and a bottom window glass channel for convenient installation in with a separate, flexible and cuttable packing strip in a car between door frame upper trim and window glass of a vehicle.

2 Claims, 5 Drawing Sheets

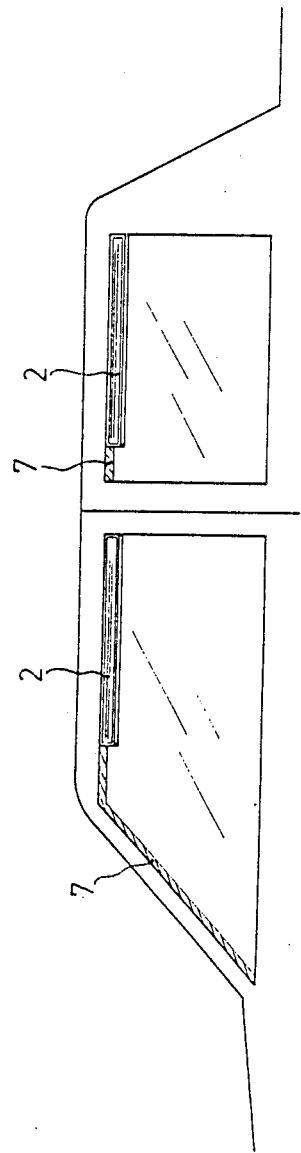

VEHICULAR INTERNAL FAN VENTILATOR

BACKGROUND OF THE INVENTION

The present invention relates to a vehicular internal fan ventilator and more particularly to the one which is energized by means of solar power.

In U.S. Pat. No. 4,741,256 of Feng-Lin HUANG there is disclosed a kind of vehicular internal ventilating device utilizing solar energy to charge storage batteries of a vehicle to drive a motor to operate the ventilating device, in which the air inlet device is installed on the front top end portion above windshield, the external wind tubes are installed externally to the passenger compartment of a vehicle, the internal wind tubes are located inside the passenger compartment, the air exhaust device is mounted on the wall under the back seats, and the solar cell board is mounted on the roof of a vehicle.

According to HUANG's invention, the installation of a vehicular internal ventilating device is very complicated and expensive and may have to destroy the original structure of a vehicle. Further, according to conventional method, a solar cell board is generally installed inside a vehicle or mounted on car window at the inner side, of which maximum effect in collecting solar energy is difficult to achieve.

It is therefore, the main object of the present invention to provide such a vehicular internal fan ventilator which is easy to install without changing the original structure of a vehicle.

Another object of the present invention is to provide such a vehicular internal fan ventilator which is easy to operate.

Another object of the present invention is to provide such a vehicular internal fan ventilator which minimizes space consumption.

Another object of the present invention is to provide such a vehicular internal fan ventilator which utilizes a cross-flow air exhaust device to minimize power consumption and to increase air flow rate.

Another object of the present invention is to provide such a vehicular internal fan ventilator which blows air directly out of a vehicle and to the window of a vehicle to remove fog therefrom.

Still another object of the present invention is to provide such a vehicular internal fan ventilator which utilizes solar power to directly drive a motor to operate or selectively charge storage batteries or concomitantly charge storage batteries and drive a motor to operate.

A yet further object of the present invention is to provide such a vehicular internal fan ventilator in which the solar cell board is obliquely mounted on car window at the outer side to efficiently collect solar energy for operation.

SUMMARY OF THE INVENTION

The present invention relates to a vehicular internal fan ventilator and more particularly to the one which includes a housing having set therein a cross-flow air fan, a motor, storage batteries and selector switch; and a solar cell board fixedly mounted on the oblique front wall portion of the housing to collect solar energy to drive motor to operate and/or to charge the storage batteries. The present invention is convenient to install in a vehicle set between door frame upper trim and window glass of a vehicle to improve internal air circulation of a vehicle.

BRIEF DESCRIPTION OF THE DRAWINGS

FIG. 5 shows the location of the present invention which is mounted on a vehicle.

DETAILED DESCRIPTION OF THE PREFERRED EMBODIMENT

Figure 1:
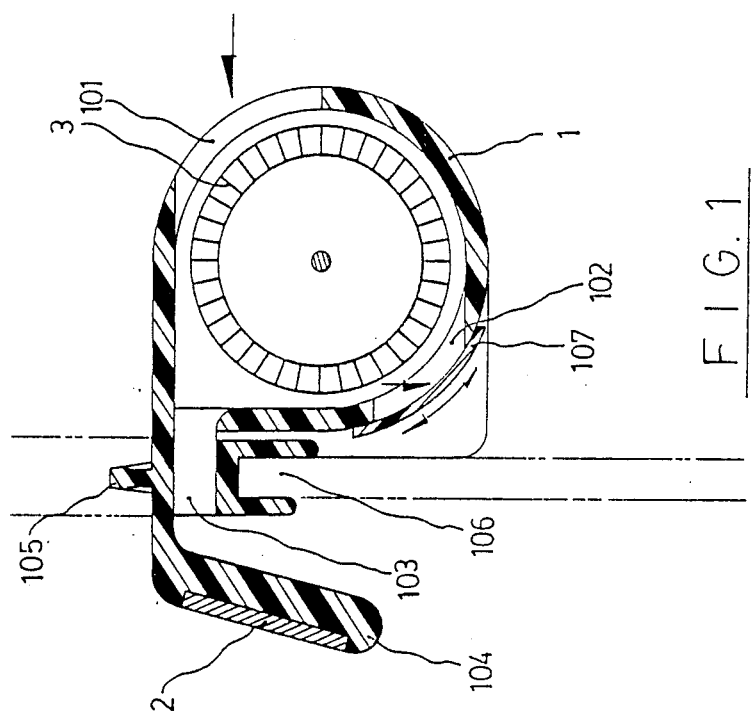
FIG. 1 is a cross sectional view of the present invention.
Figure 2:
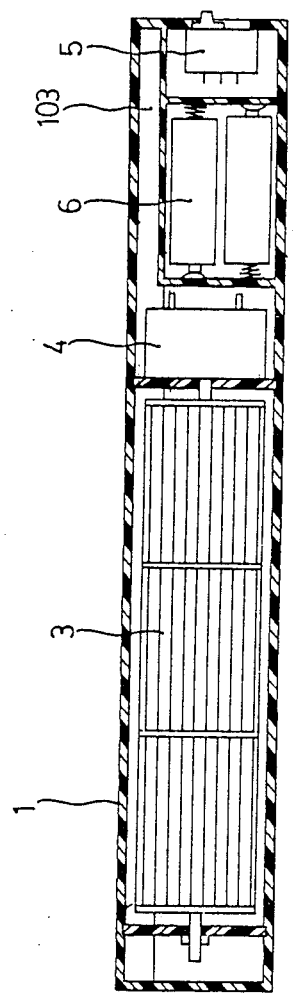
FIG. 2 is a sectional elevation of the present invention.

Referring to FIGS. 1 and 2, a vehicular internal fan ventilator according to the present invention is generally comprised of a housing 1, a solar cell board 2, a cross-flow air fan 3, a motor 4, a selector switch 5, and storage batteries 6.

The housing 1 comprises an air inlet 101, an air outlet 102, and an exhaust hole 103. The cross-flow air fan 3, the motor 4, the selector switch 5, and the storage batteries 6 are respectively set in the housing 1. The solar cell board 2 is mounted on the front wall portion 104 of the housing 1. A retainer rib 105 is integrally made on the housing 1 at the top just above the exhaust hole 103 for insertion into window glass channel of a vehicle. A window glass channel 106 is made on the housing 1 just below the exhaust hole 103. When in installation, the retainer rib 105 is inserted into a window glass channel of a vehicle and window glass is lifted to insert into the window glass channel 106 of the housing 1 to let the housing be firmly retained at the top of window glass.

Figure 3:
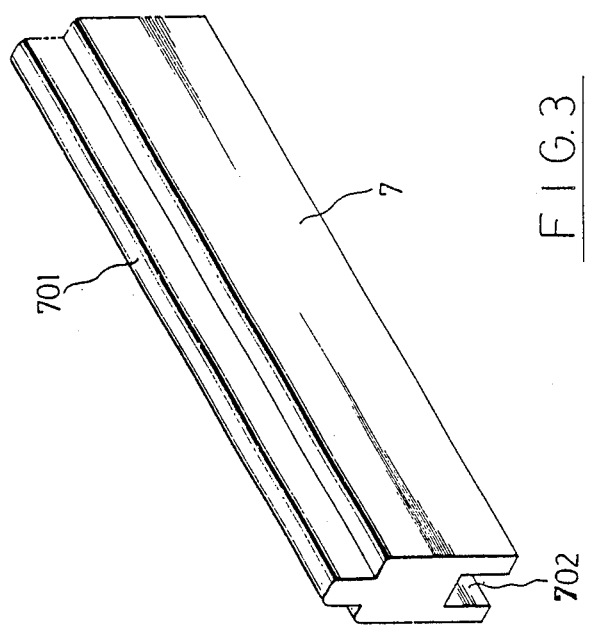
FIG. 3 is a schematic drawing illustrating the structure of a sealing strip according to the present invention.
Figure 4:
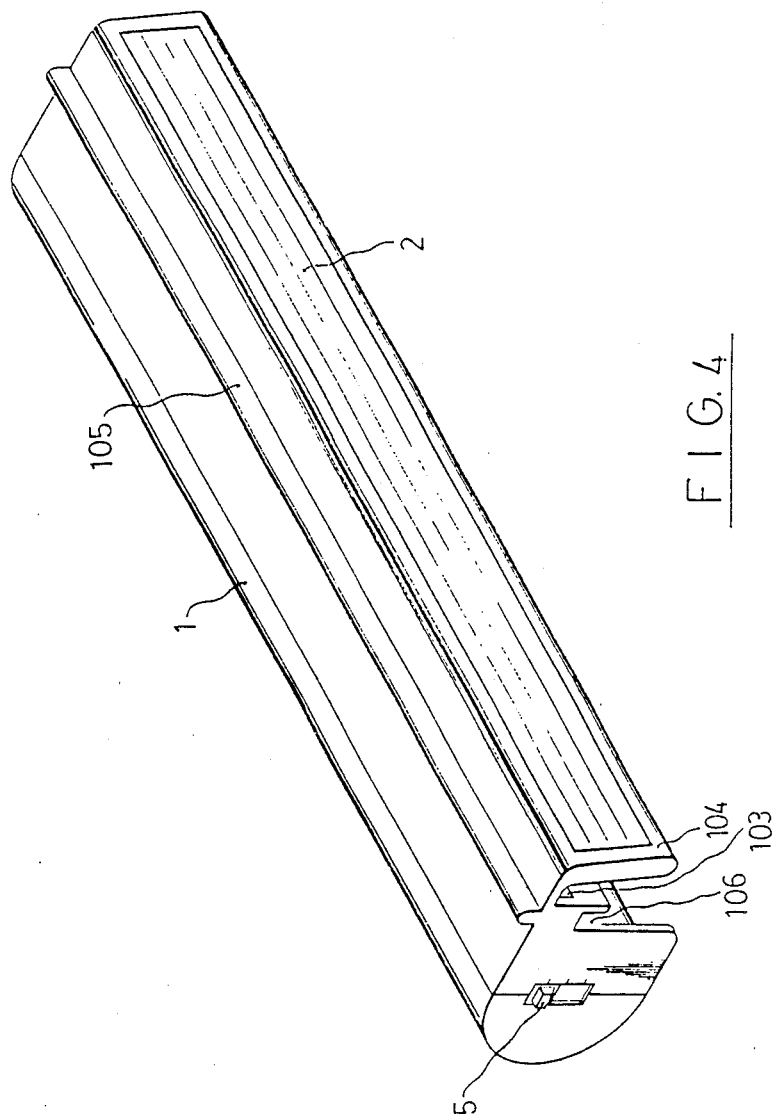
FIG. 4 illustrates the outer appearance of a vehicle internal fan ventilator embodying the present invention.

Referring to FIG. 3, therein illustrated is a packing strip 7 of the present invention for use to seal the gap between window glass and door frame upper trim of a vehicle. The packing rubber 7 comprises a retainer rib 701 at the top and a window glass channel 702 at the bottom. When in installation, the packing rubber 7 is cut into proper size according to the window glass channel of a vehicle to be sealed, and the retainer rib 701 is inserted into the window glass channel of a vehicle to let window glass be lifted to insert into the window glass channel 702. Thus, the packing strip 7 becomes firmly retained between window glass and door frame of a vehicle.

Referring to FIG. 1 again, a sliding cover 107 is provided to alternatively cover the air outlet 102 or exhaust hole 103 of the housing 1. When the air outlet 102 of the housing 1 is covered by the sliding cover 107, vehicular internal air is induced into the air inlet 101 and expelled out of a vehicle by the air fan 3 through the exhaust hole 103, without opening windows of a vehicle. When the exhaust hole 103 of the housing 1 is covered by the sliding cover 107, air current is induced from the air inlet 101 and expelled by the air fan 3 through the air outlet 102 to improve circulation of internal air.

I claim:

1. A portable air ventilator device mountable on the window of a vehicle and for use with batteries comprising:
a one-piece housing having an external portion and an internal portion, said internal portion to be situated inside said vehicle, said external portion to be situated outside said vehicle, said housing having a top end, said top end situated toward a ceiling of said vehicle, said external portion being integrated with the overall housing and linked and connected to the internal portion at the top end of the housing structure and being set obliquely with respect to said window;

retaining means for securely holding said ventilator between said window and the window frame of the vehicle;

a ventilating chamber defined in said internal portion of said housing, said chamber having a top end and a bottom end, said top end of said chamber situated toward the ceiling of said vehicle, said bottom end situated opposite said top end away from said ceiling;

one cross-flow air fan within said ventilating chamber;

a solar cell board fixedly mounted to said obliquely arranged external portion, and set adjacent to said window of said vehicle and associated with said cross-flow air fan;

powering means defined in said internal portion of said housing and associated with said solar cell board and said fan, said powering means comprised of a motor and selector switch; said motor and said batteries receiving light-converted electricity from said solar cell board;

an air inlet defined in said internal portion of said housing and communicating with said ventilating chamber, said air inlet being located such that it will be near the ceiling of said vehicle;

an exhaust opening defined in said external portion of said housing and communicating with said air inlet through said ventilating chamber and air outside said vehicle, said exhaust opening being defined in part by said external wall portion so that air is expelled generally alongside and parallel to said window upon which said ventilator device is mounted;

an air outlet defined in said internal portion of said housing and communicating with said ventilating chamber, said air outlet defined in said housing so that it is angled toward said window of said vehicle so that air will move by said window; and one sliding cover attached to said housing for movement between a first position in which said sliding cover seals in a manner that enables the circulation of internal and external air within said vehicle and a second position in which said sliding cover seals to enable circulation of internal vehicular air only, said portable air ventilator device being immediately transferrable between different window sizes and different vehicular models.

2. The portable air ventilator device of claim 1, further comprising a separate, flexible and cuttable packing strip which is meant to abut said ventilator and is for sealing the gap between said window and a window receiving channel of said vehicle, said packing strip, comprising a top retainer rib for insertion into the window receiving channel of the vehicle and a bottom window glass channel into which the window glass of the vehicle is inserted to allow said packing strip be firmly positioned to seal the gap between the window glass and door frame of the vehicle created upon insertion of said ventilator.

* * * * *